Patented June 9, 1953

2,641,587

UNITED STATES PATENT OFFICE 2,641,587

THIXOTROPIC COMPOSITIONS

Birger W. Nordlander and Robert E. Burnett, Schenectady, N. Y., assignors to General Electric Company, a corporation of New York No Drawing. Application December 31, 1949, Serial No. 136,418

8 Claims. (Cl. 260—40)

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes also have a disadvantage in that they draw away from sharp corners and edges leaving these regions practically bare.

The net result of methods of coating and filling in such a manner is a very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as, for example, electrical coils, has been involved, the amount of material retained after a single application is in most cases insufficient to afford a structure having the required electrical and mechanical properties. Several successive applications and bakings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower overall heat dissipation rate as compared with a completely void-free structure. In high voltage equipment the presence of voids in the insulation also gives rise to internal corona discharge wtih resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which, by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper vacuum-pressure impregnating technique, not only to fill completely all the spaces in an open structure, such as a coil, but also to maintain this condition subsequently during the curing operation, provided that substantially no drainage of varnish occurs during the baking process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result an open structure coated or filled with such a solventless varnish composition will continuously suffer loss of the varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from objects prior to and during curing.

Another object of this invention is to provide coating and filling compositions which may be applied and cured without loss of the composition.

A further object of the present invention is to provide coating and filling compositions which when applied to objects will remain in situ before and during curing even on corners and sharp edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperature or at the elevated temperatures required for complete conversion of the composition to the infusible and insoluble state. The unusual combination of properties characterizing these compositions rests in the discovery that suitable quantities of certain specific fillers, in combination with solventless varnishes or polymerizable liquids, form compositions which are fluid as long as they are kept in an agitated condition but solidify shortly after agitation has ceased and will not flow either at room temperature or at temperatures up to about 150° C. unless mechanically disturbed before they have hardened by polymerization.

While it is well-known that the incorporation of fillers into a varnish will reduce the flow of the resulting mixture by reason of increased viscosity, this general property is not relied upon for the properties of the present compositions. The specific fillers which are here employed with solventless varnishes form thixtropic compositions capable of undergoing isothermal, reversible, sol-gel transformations, a fluid sol condition existing as long as the mixture is agitated, the sol reverting to a gel within a very short time after agitation has ceased. However, upon heating the gel it polymerizes into an infusible product which is no longer capable of reversion to the fluid sol state. The system may be simply expressed by the following relationship:

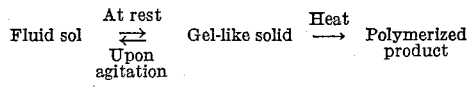

The term "thixotropy" is used herein to denote the property of a fluid filler-liquid composition to revert rapidly on standing into a gel-like mass having sufficient cohesive strength to withstand distortion by gravitational force when suspended freely as in an inverted receptacle or on a coated object. The gel is also of such a nature that it can be fluidified by the application of mechanical agitation as by shaking, stirring, vibrating etc. The property of thixtropy as understood herein is thus characterized by a reversible isothermal sol⇌gel transition.

The compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydride alcohols, mixtures of polyhydric alcohols or mixtures of polyhydric and monohydric alcohols, and an alpha unsaturated alpha,beta polycarboxylic acid or a plurality of polycarboxylic acids, one of which, at least, is unsaturated polycarboxylic acid, the resinous material having an acid value of up to 60 and preferably between 45 and 60. Examples of such polyhydric alcohols are ethylene glycol, di- and triethylene glycols, propylene glycol, trimethylene glycol, tetramethylene glycol, pentamethylene glycol, glycerine or pentaerythritol in combination with a monohydride alcohol etc. Examples of alpha unsaturated alpha,beta polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are diallyl phthalate, diallyl succinate, diallyl maleate, diallyl fumarate, diallyl itaconate, diallyl chlorophthalates and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

It has been found that a new class of thixotropic solventless varnishes may be produced by using in conjunction with the alkyd type materials as described above a material comprising glycol esters of methacrylic acid. Examples of such materials are the mono-, di-, tri-, and tetraethylene glycol dimethacrylates.

It has been found that any of a large group of fillers may be used to produce thixotropic properties in the present alkyd-methacrylic acid ester combinations. Among the fillers which may be used are mineral silicates such as catalpo clay, bucca clay, Kentucky ball clay, Georgia kaolin and bentonite. The useful range of such fillers varies from about 38 per cent to about 60 per cent by weight of the composition.

Other thixotropic solventless varnish-filler compositions are disclosed in copending applications Serial Numbers 136,411, 136,412, 136,413, 136,415, 136,416, 136,417, filed concurrently herewith and assigned to the same assignee as the present application.

The thixotropic compositions of this invention may be converted into an infusible insoluble state by means of heat alone, for example, by curing parts coated or filled with these compositions at temperatures of from about 80° C. to about 150° C., or more preferably from about 100° C. to about 125° C. However, for practical reasons, it is desirable to incorporate a polymerization initiator, or catalyst, in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, dietieriary butyl diperhthalate, and tertiary butyl hydroperoxide. Any suitable amount of catalyst may be used, but in general the catalyst concentration will be within the range of from about 0.5 to about 2.0 per cent by weight of the polymerizable liquid composition.

The following will illustrate the preparation of thixotropic compositions using the above materials. As described in copending application Serial No. 136,414, filed concurrently herewith and assigned to the same assignee as the present application, the small amount of tertiary butyl catechol often present in the maleate resin as an anti-skinning agent tends to shorten the stable life of the thixotropic compositions made therefrom. As further described in the above-cited application, a small amount of quinone counteracts the life shortening property of the tertiary butyl catechol which occurs when the latter reacts with certain polymerization catalysts. While the compositions below contain quinone it will be understood that the quinone is not an essential ingredient for producing thixotropy but is present merely as an agent which imparts a longer shelf or storage life to the compositions. All parts are by weight.

EXAMPLE 1

| | Parts |
|---|---|
| Ethylene glycol dimethacrylate | 67 |
| Catalpo clay | 33 |
| Benzoyl peroxide | 0.3 |

EXAMPLE 2

| | Parts |
|---|---|
| Tetraethylene glycol dimethacrylate | 68 |
| Catalpo clay | 32 |
| Benzoyl peroxide | 0.3 |

The above compositions obtained by mixing the above compositions together exhibited thixotropic properties. However, when they were applied to flat surfaces and cured for sixteen hours at 100° C. the surface was left in a porous, chalky and generally unsuitable condition.

It was found that this condition could be corrected by the addition of an unsaturated alkyd resin as described above in the order of from one-half to one part per each part of the ethylene glycol dimethacrylate ester.

A basic composition was prepared as below:

*Composition A*

| | Parts |
|---|---|
| Tetraethylene glycol dimethacrylate | 64.0 |
| Diethylene glycol maleate | 36.0 |
| Tertiary butyl perbenzoate | 1.0 |
| Quinone | 0.01 |

Catalpo clay was then added to the above composition A in the proportions shown below; all parts being by weight. The catalpo clay in Examples 3, 4, 5 and 6 were dried to constant weight at 105° C.

| Example | 3 | 4 | 5 | 6 |
|---|---|---|---|---|
| Composition A | 58 | 60 | 62 | 66 |
| Catalpo clay | 42 | 40 | 38 | 34 |

When the above ingredients were thoroughly mixed in the above proportions, highly thixotropic materials resulted. Glass rods dip-coated with the materials of Examples 3, 4 and 5, in which the catalpo clay had been pre-dried, showed no drainage of the coating after hanging for sixteen hours at room temperature. Neither had any of the coatings drained from the rods after curing for sixteen hours at 100° C. This total absence of drainage is in direct contradistinction to results obtained when the polymerizable composition A is used alone. In such case when a glass rod is dip-coated with the composition, practically all the coating had drained off after hanging at room temperature for a short time.

In the case of Example 6, containing only 34 per cent of dried catalpo clay, about 32 per cent of the coating had drained off the glass rod after sixteen hours at room temperature. It is thus evident that over 34 per cent of filler is required to render the resin-catalpo clay mixture thixotropic.

In order to determine the effect of acidity on the thixotropy-inducing properties of the catalpo clay a series of mixtures were prepared having the following constituents, the polymerizable liquid component being the same as above except that 0.05 part by weight instead of 0.01 part by weight of quinone were used. This polymerizable component is denoted as compound B. In the examples the pH value is that of an aqueous extract of the clay filler. The clay was used in the as received condition.

| Example | 7 | 8 | 9 | 10 |
|---|---|---|---|---|
| Compound B | 65 | 65 | 65 | 65 |
| Catalpo clay | 35 | 35 | 35 | 35 |
| pH value of clay extract | 3.2 | 4.5 | 5.2 | 6.3 |

Each of the above compositions was highly thixotropic. A glass rod dip-coated in the compositions of Examples 7 through 10 showed no drainage of the coating after hanging for sixteen hours at room temperature. Neither was any drainage apparent after sixteen additional hours at 100° C. It is apparent that the pH of the catalpo clay within the above range has no effect on the thixotropic properties of the compositions.

Another series of experiments were carried out using catalpo clay of various acidities which was dried for five hours at 200° C.

| Example | 11 | 12 | 13 | 14 |
|---|---|---|---|---|
| Compound B | 65 | 65 | 65 | 65 |
| Catalpo clay | 35 | 35 | 35 | 35 |
| pH value of clay extract | 3.2 | 4.5 | 5.2 | 6.3 |

Again each of the above compositions was highly thixotropic. Glass rods were dip-coated with each of the above compositions. When hung at room temperature for sixteen hours, none of the coatings showed any drainage. Neither was any drainage apparent after a sixteen hour cure at 100° C.

From the above it may be concluded that catalpo clay may be used in the as received or dried condition and at various acidities to produce thixotropic resin-filler combinations.

Results similar to those above were obtained when using other related fillers such as bucca clay, Kentucky ball clay and bentonite.

| Example | 15 | 16 |
| --- | --- | --- |
| Compound B | 65 | 35 |
| Bucca clay | 35 | 65 |

In Example 15 the bucca clay was used as received whereas in Example 16 it was dried for twenty-one hours at 200° C. In both cases the resultant mixtures were highly thixotropic. No drainage was evident from glass rods dip-coated with the mixtures either after sixteen hours at room temperature and a cure of sixteen hours at 100° C.

| Example | 17 | 18 |
| --- | --- | --- |
| Compound B | 50 | 50 |
| Kentucky ball clay | 50 | 50 |

In Example 17 the Kentucky ball clay was used as received; in Example 18 it was first dried at 200° C. for twenty-one hours. A glass rod dipped in the thixotropic mixture of Example 17 showed no drainage after sixteen hours at room temperature and sixteen hours at 100° C. A glass rod dip-coated in the thixotropic mixture of Example 17 showed no drainage after sixteen hours at room temperature and sixteen hours at 100° C. A glass rod dip-coated in the thixotropic mixture of Example 18 showed practically no drainage after sixteen hours at room temperature and no further drainage after sixteen additional hours at 100° C.

| Example | 19 | 20 |
| --- | --- | --- |
| Compound B | 64 | 47 |
| Bentonite (Alkaline) | 36 | 53 |

The bentonite of Example 19 was used as received whereas that in Example 20 was dried at 200° C. for twenty-one hours. In both cases the resin-bentonite filler combinations were highly thixotropic. Glass rods dip-coated in the mixtures exhibited no drainage after sixteen hours at room temperature or sixteen more hours at 100° C.

What we claim as new and desire to secure by Letters Patent of the United States is:

1. A thixotropic composition comprising a polymerizable liquid comprising a liquid unsaturated alkyd resin obtained by the esterification of a mixture of ingredients comprising a polyhydric alcohol and an alpha unsaturated alpha, beta polycarboxylic acid and a polymerizable glycol ester of methacrylic acid and a filler selected from the class consisting of catalpo clay, bucca clay, Kentucky ball clay, Georgia kaolin and bentonite, the said filler comprising, by weight, from 35 to 53 percent of the total weight of the filler and the polymerizable liquid, and the unsaturated alkyd resin being present, by weight, in an amount up to at most one part of the latter per part of the aforesaid polymerizable glycol ester.

2. A thixotropic composition comprising a polymerizable fluid comprising a liquid unsaturated alkyd resin obtained by the esterification of a mixture of ingredients comprising a polyhydric alcohol and an alpha unsaturated alpha, beta polycarboxylic acid and a polymerizable ethylene glycol ester of methacrylic acid and a filler selected from the class consisting of catalpo clay, bucca clay, Kentucky ball clay, Georgia kaolin and bentonite, the said filler comprising, by weight, from 35 to 53 percent of the total weight of the filler and the polymerizable liquid, and the unsaturated alkyd resin being present by weight in an amount equal to at most one part of the latter per part of the aforesaid polymerizable ethylene glycol ester.

3. A thixotropic composition comprising a polymerizable fluid comprising tetraethylene glycol dimethacrylate and liquid diethylene glycol maleate obtained by the esterification of a mixture of ingredients comprising diethylene glycol and maleic anhydride and a filler selected from the class consisting of catalpo clay, bucca clay, Kentucky ball clay, Georgia kaolin and bentonite, the said filler comprising, by weight, from 35 to 53 percent of the total weight of the filler and the polymerizable fluid, and the diethylene glycol maleate being present by weight in an amount equal to at most one part of the latter per part of the tetraethylene glycol dimethacrylate.

4. A thixotropic composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising catalpo clay, the said clay comprising from 35 to 53 percent, by weight, of the total weight of the clay and the polymerizable fluid, the aforesaid diethylene glycol maleate being present, by weight, in an amount equal to at most one part of the latter per part of the tetraethylene glycol dimethacrylate.

5. A thixotropic composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising bucca clay, the said clay comprising from 35 to 53 percent, by weight, of the total weight of the clay and the polymerizable fluid, the aforesaid diethylene glycol maleate being present, by weight, in an amount equal to at most one part of the latter per part of the tetraethylene glycol dimethacrylate.

6. A thixotropic composition comprising a polymerizable fluid comprising tetraethylene glycol dimethacrylate and liquid diethylene glycol obtained by the esterification of a mixture of ingredients comprising diethylene glycol and maleic anhydride, and a filler comprising Kentucky ball clay, the said clay comprising from 35 to 53 percent, by weight, of the total weight of the clay and the polymerizable fluid, the aforesaid diethylene glycol maleate being present, by weight, in an amount equal to at most one part of the latter per part of the tetraethylene glycol dimethacrylate.

7. A thixotropic composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising Georgia kaolin clay, the said clay comprising from 35 to 53 percent, by weight, of the total weight of the clay and the polymerizable fluid, the aforesaid diethylene glycol maleate being present, by weight, in an amount equal to at most one part of the latter per part of the tetraethylene glycol dimethacrylate.

8. A thixotropic composition comprising a polymerizable fluid comprising tetraethylene glycol dimethacrylate and liquid diethylene glycol maleate obtained by the esterification of a mixture of ingredients comprising diethylene glycol and maleic anhydride, and a filler comprising bentonite clay, the said clay comprising from 35 to 53 percent, by weight, of the total weight of the clay and the polymerizable fluid, the aforesaid diethylene glycol maleate being present, by weight, in an amount equal to at most one part of the latter per part of the tetraethylene glycol dimethacrylate.

BIRGER W. NORDLANDER.
ROBERT E. BURNETT.

References Cited in the file of this patent

UNITED STATES PATENTS

| Number | Name | Date |
| --- | --- | --- |
| 1,942,757 | Iliff et al. | Jan. 9, 1934 |
| 2,216,514 | Isenberg | Oct. 1, 1940 |
| 2,407,479 | D'Alelio | Sept. 10, 1946 |
| 2,482,086 | Foster | Sept. 20, 1949 |
| 2,549,732 | Weaver | Apr. 17, 1951 |

OTHER REFERENCES

Industrial Chemistry of Colloidal and Amorphous Materials by Lewis et al., published 1943 by the MacMillan Co., pages 243 and 327.